(12) United States Patent
Zeira

(10) Patent No.: US 6,369,944 B1
(45) Date of Patent: Apr. 9, 2002

(54) DIFFUSER-COATED PROJECTION SCREEN ELEMENT AND METHOD OF MANUFACTURE

(75) Inventor: Eitan C. Zeira, Nashua, NH (US)

(73) Assignee: Nashua Corporation, Nashua, NH (US)

( * ) Notice: Subject to any disclaimer, the term of this patent is extended or adjusted under 35 U.S.C. 154(b) by 0 days.

(21) Appl. No.: 09/612,719

(22) Filed: Jul. 10, 2000

Related U.S. Application Data

(60) Provisional application No. 60/143,763, filed on Jul. 12, 1999.

(51) Int. Cl.[7] .............................. G03B 21/60; B32B 1/00
(52) U.S. Cl. .................................. 359/452; 264/171.13
(58) Field of Search ........................... 359/443, 449, 359/452, 453; 264/129, 171.13, 171.14; 156/244.11, 244.23, 244.26, 244.24

(56) References Cited

U.S. PATENT DOCUMENTS

| 3,679,451 A | 7/1972 | Marks et al. ............... 117/33.3 |
| 3,712,707 A | 1/1973 | Henkes, Jr. .................. 350/122 |
| 3,883,617 A | 5/1975 | Krieg et al. ................. 260/883 |
| 3,992,486 A | 11/1976 | Lang .......................... 260/885 |
| 4,083,626 A | 4/1978 | Miyahara et al. ........... 350/117 |
| 4,152,618 A | 5/1979 | Abe et al. .................... 313/116 |
| 4,184,745 A * | 1/1980 | Land ........................... 359/452 |
| 4,232,939 A | 11/1980 | Kikuchi ...................... 350/129 |
| 4,721,361 A | 1/1988 | van de Ven .................. 350/128 |
| 4,730,897 A | 3/1988 | McKechnie et al. ........ 350/128 |
| 4,911,529 A | 3/1990 | Van De Ven ................ 350/127 |
| 4,983,016 A | 1/1991 | Yamamoto ................... 350/126 |
| 5,170,287 A | 12/1992 | Ludwig, Jr et al. ......... 359/452 |
| 5,198,267 A | 3/1993 | Aharoni et al. ............. 427/162 |
| 5,307,205 A | 4/1994 | Ludwig, Jr. et al. ........ 359/453 |
| 5,346,954 A | 9/1994 | Wu et al. ...................... 525/85 |
| 5,361,163 A * | 11/1994 | Matsuda et al. ............. 359/452 |
| 5,456,967 A * | 10/1995 | Nezu ........................... 428/141 |
| 5,457,572 A * | 10/1995 | Ishii et al. ................... 359/457 |
| 5,473,454 A | 12/1995 | Blanchard ..................... 359/69 |
| 5,475,533 A * | 12/1995 | Steenblik et al. ........... 359/628 |
| 5,486,884 A * | 1/1996 | De Vaan ...................... 353/122 |
| 5,494,743 A | 2/1996 | Woodard et al. ............ 428/336 |
| 5,513,036 A | 4/1996 | Watanabe et al. ........... 359/457 |
| 5,668,662 A * | 9/1997 | Magocs et al. .............. 359/452 |
| 5,706,134 A * | 1/1998 | Konno et al. ................ 359/599 |
| 5,724,182 A | 3/1998 | Mitani et al. ................ 359/457 |
| 5,744,227 A | 4/1998 | Bright et al. ................ 428/216 |
| 5,783,049 A | 7/1998 | Bright et al. ........... 204/192.14 |
| 5,815,313 A * | 9/1998 | Mitani et al. ................ 359/448 |
| 5,880,887 A | 3/1999 | Goto ........................... 359/626 |
| 5,932,342 A | 8/1999 | Zeira et al. .................. 428/327 |
| 5,939,189 A | 8/1999 | Phillips et al. .............. 428/336 |
| 5,981,059 A | 11/1999 | Bright et al. ................ 428/336 |
| 6,040,941 A * | 3/2000 | Miwa et al. ................. 359/443 |
| 6,247,818 B1 * | 6/2001 | Hedblom et al. ........... 359/540 |

FOREIGN PATENT DOCUMENTS

| EP | 0 311 189 A1 | 12/1989 | ........... G03B/21/60 |
| EP | 0 617 299 A1 | 9/1994 | ........... G02B/5/02 |
| EP | 0 859 270 A1 | 8/1998 | ........... G03B/21/62 |

* cited by examiner

Primary Examiner—Christopher E. Mahoney
(74) Attorney, Agent, or Firm—Testa, Hurwitz and Thibeault, LLP

(57) ABSTRACT

A projection screen element is described that includes a substrate and a diffusion coating disposed on the substrate. The diffusion coating includes a matrix having a first index of refraction and a plurality of particles having a second index of refraction disposed within the matrix. The substrate may be translucent for use as a rear projection screen element or reflective for use as a front projection screen element. A method of making a projection screen element also is described.

8 Claims, 1 Drawing Sheet

DIFFUSER-COATED PROJECTION SCREEN ELEMENT AND METHOD OF MANUFACTURE

RELATED APPLICATION

This application claims the benefit of copending U.S. Provisional Patent Application Serial No. 60/143,763, filed Jul. 12, 1999, the entire disclosure of which is incorporated herein by reference.

FIELD OF THE INVENTION

The invention relates generally to projection screens and more specifically to a diffuser-coated projection screen element and method of manufacture.

BACKGROUND OF THE INVENTION

Large projection screens are known in the art but typically are either poor in quality due to poor diffusion characteristics or prohibitively expensive to produce in large quantities. Generally, the assembly of large, high-quality projection screens is difficult and labor intensive because more than one layer must be assembled into a single screen. Large, high-quality projection screens generally require, for example, assembly of layers within a bracket and/or adhesion and/or lamination of one or more layers with optically clear adhesives. The costs associated with assembling large, high quality projection screens have hindered their mass production. Furthermore, due to the large size of the individual assembly layers, these layers often bow, buckle and/or pop out of the assembly over time. Finally, high-quality large projection screens are difficult to transport and/or store efficiently because they typically cannot be folded or rolled.

SUMMARY OF THE INVENTION

A large, high-quality projection screen element has been developed that may be mass-produced and is stable over time because the diffusion layer is coated directly onto a substrate. Coating the diffusion layer onto the substrate eliminates the need to affix the diffusion layer with adhesives or assemble the layers into a bracket, which is labor intensive. The element is stable because the diffusion layer is coated and therefore will not easily bow or buckle from the substrate. Also the projection screen element of the present invention may be folded, rolled or wound about a cylinder so that it may be stored easily and efficiently.

In one aspect of the present invention, a projection screen element is provided that comprises a substrate and a diffusion coating disposed on the substrate. The diffusion coating comprises a matrix having a first index of refraction and a plurality of particles having a second index of refraction disposed within the matrix. The substrate may be translucent for a rear projection screen element, or reflective for a front projection screen element.

In another aspect of the present invention, a method for making a projection screen element is provided comprising the following steps: providing a substrate; providing a matrix material; providing a dispersion material having an index of refraction different from that of the matrix material; dispersing the dispersion material and the matrix material to form a mixture; and coating a surface of the substrate with the mixture.

The invention will be understood further upon consideration of the following drawings, description and claims.

DESCRIPTION OF THE DRAWINGS

The invention is pointed out with particularity in the appended claims. The drawings are not necessarily to scale, emphasis instead generally being placed upon illustrating the principles of the invention. The advantages of the invention described above, as well as further advantages of the invention, may be better understood by reference to the description taken in conjunction with the accompanying drawings, in which:

DETAILED DESCRIPTION OF THE INVENTION

Figure 1:
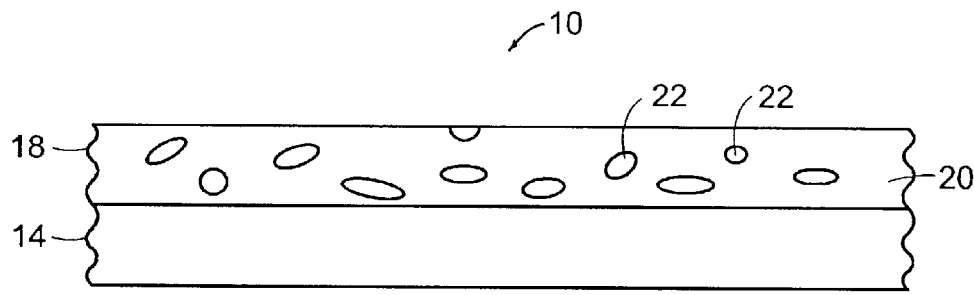
FIG. 1 is a schematic cross-sectional side view of an embodiment of a projection screen element in accordance with the present invention.

In order to more clearly and concisely describe the subject matter of the claims, the following definitions are intended to provide guidance as to the meaning of specific terms used in the following written description, examples and appended claims. Furthermore, U.S. Pat. No. 5,932,342, issued Aug. 3, 1999, and U.S. patent application Ser. No. 09/151,389, filed Sep. 10, 1998, describe in detail, various materials and methods applicable to the present invention and are incorporated herein by reference.

"Angle of view" (AOV) as used herein is a measurement of illumination for all angles relative to two perpendicular axes in the plane of the material. These are called the X-axis or the horizontal axis, and the Y-axis or the vertical axis. The angle of view may be measured by applying a "full-width at half maximum" approach. The AOV at full-width at half maximum (AOV $\alpha(\frac{1}{2})$) is calculated from sum of the absolute value of the angles (measured from an orthogonal to the plane of the material) at which the transmitted light intensity at one-half the maximum light intensity is measured and noted. For example, if angles of +35° and −35° were measured to have one-half of the maximum light intensity in the horizontal direction, the AOV $\alpha(\frac{1}{2})$ in the horizontal direction for the screen would be 70°.

"Asymmetry ratio" as used herein is the horizontal AOV $\alpha(\frac{1}{2})$ divided by the vertical AOV $\alpha(\frac{1}{2})$, and thus is a measure of the degree of asymmetry between the horizontal illumination and the vertical illumination of the diffuser.

"Coating" means a layer of a first substance covering a second substance such that the first substance is substantially conformed to and/or bonded with the second substance without adhesives or external force. The bond may be formed chemically. For example, the bond may be formed by cross-linking between the first substance and the second substance. The bond also may be formed by mechanical interlock with the substrate. For example, the bond may be formed by hardening the first substance after it has seeped into an irregular surface of the second substance in a molten or liquid state. It should be understood that to coat a substrate means to form a coating on the substrate. The diffusion coating of the present invention is different from a typical diffusive layer in a projection screen assembly because, for example, it does not require adhesion to a substrate by clear adhesive or a bracket to retain the layer within an assembly. Further, it will not bow, bend or pop-out of an assembly because it is coated onto a substrate.

As used herein the term "gain" means a ratio of the maximum intensity of light transmitted through a light-transmitting material in a given direction relative to the intensity of light transmitted through a theoretically perfect diffuser in the same direction. To measure the gain of a particular sheet of material, a known amount of light is supplied to the sheet, and the maximum intensity of light transmitted through the sheet is measured using a standard luminance meter. The maximum intensity of light measured is then compared to a theoretically "perfect" diffusive material. The gain is determined by dividing the value of the maximum intensity by the value of the intensity of the theoretically perfect diffuser (line TP). For a theoretically perfect diffusive material, providing one foot-candle (10.76 lumen/m$^2$) of illumination to the material results in the transmission of one footlambert of luminance at all angles of transmission. Therefore, if the maximum intensity of luminance transmitted by a material is equal to one footlambert, its gain with respect to a theoretical diffuser is 1.0 for that angle of transmission. For imperfect diffusers, the gain will be maximum and larger than 1 for a viewing direction orthogonal to the plane of the diffuser. This means that the screen is brighter when viewed orthogonal to the plane than at other angles. Because the light transmitted by the material can never be more than the amount of light supplied, less light must be transmitted at angles other than the angle of maximum intensity.

"Resolution" refers to the clarity or fineness of detail in a projected image. Resolution can be measured by placing a USAF 1951 negative chromium test target behind the projection screen to be analyzed, illuminating the chart and the screen with white light at various incident angles, and then capturing and digitizing the projected image. The intensity of the captured image is then calculated at various points at the target lines per millimeter pattern using the USAF 1951 test standard. The intensity in the slit area is measured and noted as $I_{peak}$ and the intensity between the slits is measured and noted as $I_{valley}$. The resolution at the target lines per millimeter pattern is then determined by calculating the modulation transfer function (MTF) using the following formula: % MTF=$[(I_{peak}-I_{valley})/(Ipeak+I_{valley})] \times 100$. The resolution is the % MTF at the target lines per millimeter.

"Large, high-quality projection screens" as used herein refers to projection screens generally greater than about two feet in width and/or length and having the following characteristics: a gain of greater than about 1, preferably greater than about 3; an AOV α(½) of at least about 35 in both directions, preferably at least about 50 in both directions; an asymmetry ratio of from about 1 to about 7, preferably from about 2 to about 5, and a resolution of at least 50% at 4 lines per mm. These projection screens are typically used for projection in classrooms or meeting rooms with, for example, a LCD projector or an overhead projector.

FIG. 1 is a schematic cross-sectional side view of an embodiment of projection screen element 10 constructed in accordance with the present invention. Projection screen element 10 includes substrate 14 and diffusion coating 18 disposed on substrate 14. Diffusion coating 18 includes matrix 20 having a first index of refraction and plurality of particles 22 having a second index of refraction disposed within matrix 20.

Suitable substrates may be clear or light diffusing. A substrate may be translucent in the case of a rear projection screen element. Substrate materials suitable for use in accordance with the present invention include polyethylene, polyester, polypropylene and polyurethane. An example of such a translucent substrate, suitable for use in accordance with the present invention is dimethyl terephthalate (DMT) polyester film sold under the trade name MYLAR® available from Dupont (Wilmington, Del.).

Alternatively, a substrate may be reflective in the case of a front projection screen element. For example, a layer or film that is metalized with aluminum, gold or silver might be used for a front projection screen element. Preferably, for economic reasons, an aluminized film is used. An example of such an aluminized film, suitable for use in accordance with the present invention is an aluminized dimethyl terephthalate polyester film available from Madico, Inc. (Woburn, Mass.).

A diffusion coating may be disposed on either surface of a substrate. Optionally, a diffusion coating may be disposed on both surfaces of the substrate. Preferably, if the projection screen element is to be used in a front projection screen, a reflective or metallized surface of the substrate is coated with the diffusion coating in order to protect the reflective surface from damage and/or erosion. Also, the highly irregular, metalized surface of the substrate may promote stronger mechanical interlock between the coating and the substrate.

The surfaces of a substrate may be smooth, i.e., substantially free of irregularities. Alternatively, one or both surfaces of a substrate may define a texture or pattern. For example, one or both surfaces of the substrate may define a Fresnel lens structure, a lenticular lens structure, a random diffusion structure or a combination of these structures. Alternatively or additionally, one or both surfaces may have microscopic irregularities that promote mechanical interlock with the diffusion coating. For example, a surface of the substrate may define a Fresnel structure that is further metalized and then coated with a diffusion coating.

A matrix preferably is durable, stable, and able to be coated to the substrate as well as any further topcoat layers, such as an antireflective layer. Suitable matrix materials include acrylics, such as polymethylmethacrylates and polyethylethylacrylates; polyesters; polystyrenes; polyolefins, such as polyethylenes, polypropylenes, and their copolymers; polyamides; organic acid cellulose esters, such as cellulose acetate butyrates, cellulose acetates, and cellulose acetate propionates; silicone polymers; and polycarbonates. In a preferred embodiment, polypropylene/polyethylene copolymers may be used.

Particles useful in the invention may include various materials, including acrylics, such as polymethylacrylates; polystyrenes; polypropylenes; organic acid cellulose esters, such as cellulose acetate butyrates, cellulose acetates, and cellulose acetate propionates; and polycarbonates. In a preferred embodiment, polystryrene may be used.

Particles may be ellipsoidal and/or spheroidal. In a preferred embodiment, the particles are ellipsoidal and typically are all oriented with their major axes substantially in one direction in the plane of the surface of diffusion coating. Preferably, the particles are made from a material that is capable of being deformed at a processing temperature in order to create their ellipsoidal shape. Particles may be deformed, for example, by stretching the coating as it exits an extruder die by setting the rate at which the substrate travels faster than the rate at which the diffusion coating is extruded. Alternatively or additionally, the pressure exerted on the particles as they exit from the die may deform particles. For example particles of polystyrene at a processing temperature of 350° F. are in a molten state and will deform in the direction of extrusion as they exit a slot die, due to the pressure at the slot opening. Similarly, particles may be deformed by blow molding the coating onto a substrate. Further, the volume density of the particles, the average ellipsoidal particle minor axis size, and the index of refraction the ellipsoidal particles may be optimized to control the horizontal viewing angle and other desired properties of diffusion coating.

Oriented ellipsoidal particles act as individual lenses to preferentially refract the light passing through it in the direction orthogonal to the direction of orientation, resulting in an increased angle of view in that direction relative to a screen not having the ellipsoidal particles. This is generally achieved at the expense of the angle of view in the direction of orientation. Therefore, as discussed in greater detail below, the addition of the dispersion materials that are spheroidal may increase the refraction of light and thus the angle of view in the direction parallel to the direction of orientation, independently of the ellipsoidal particles.

The average particle size of the ellipsoidal particles in the matrix may be from about 1 micrometer ($\mu$m) to about 30 $\mu$m, preferably from about 2 $\mu$m to about 15 $\mu$m, and most preferably from about 2 $\mu$m to about 5 $\mu$m in the minor dimension.

The differential refractive index ($\Delta n_{ME}$) defined as the absolute value of the difference between the index of refraction of the matrix ($n_M$) and the index of refraction of the ellipsoidal dispersion material ($n_E$), or $|n_M - n_E|$, may be from about 0.005 to about 0.2, and preferably is from about 0.007 to about 0.1.

A suitable processing temperature for forming the ellipsoidal particles may be determined from the glass transition temperature and melt temperature of the ellipsoidal particle material used and the amount of deformation desired. A processing temperature approaching or close to the glass transition temperature will result in less deformation than a processing temperature approaching or surpassing the melt temperature, with all other variables including the amount the material is stretched remaining the same.

If some or all of the particles are spheroidal, preferably they are substantially incapable of deformation at the processing temperature so that they remain substantially spheroidal throughout the formation of the coating, as well as the formation of the ellipsoidal particles, if any. A suitable spheroidal particle material may be chosen such that it is substantially incapable of deformation at the processing temperature by choosing a material for which the glass transition temperature and the melt temperature is higher than the processing temperature. Suitable spheroidal dispersion materials include acrylics, and preferably cross-linked acrylics, such as the so-called "core-shell" cross-linked acrylic polymers manufactured by Rohm and Haas Company (Philadelphia, Pa.).

The spheroidal particles contribute to the angle of view in the direction parallel to the direction of orientation, which might otherwise fall below desired levels when the ellipsoidal shape and orientation is induced in the ellipsoidal particles. Also, the presence of the spheroidal particles serves to minimize the amount of scintillation or speckle. Alternatively, one might use, instead of spheroidal particles, non-spheroidal particles that are not oriented to preferentially refract light. This also would reduce the amount of scintillation or speckle, i.e., dark and light spots in the projected image.

The volume density and the average particle size may be optimized to control the vertical viewing angle and other desired properties of the material, for example, to minimize or eliminate scintillation. The average particle size of the spheroidal particles in the matrix may be from about 1 micrometer ($\mu$m) to about 30 $\mu$m, preferably from about 5 $\mu$m to about 30 $\mu$m, and most preferably from about 10 $\mu$m to about 30 $\mu$m. The differential refractive index ($\Delta n_{MS}$) defined as the absolute value of the difference between the index of refraction of the matrix ($n_M$) and the index of refraction of the ellipsoidal particles ($n_S$), or $|n_M - n_S|$, may be from about 0.005 to about 0.2, and preferably is from about 0.007 to about 0.1.

Figure 2:
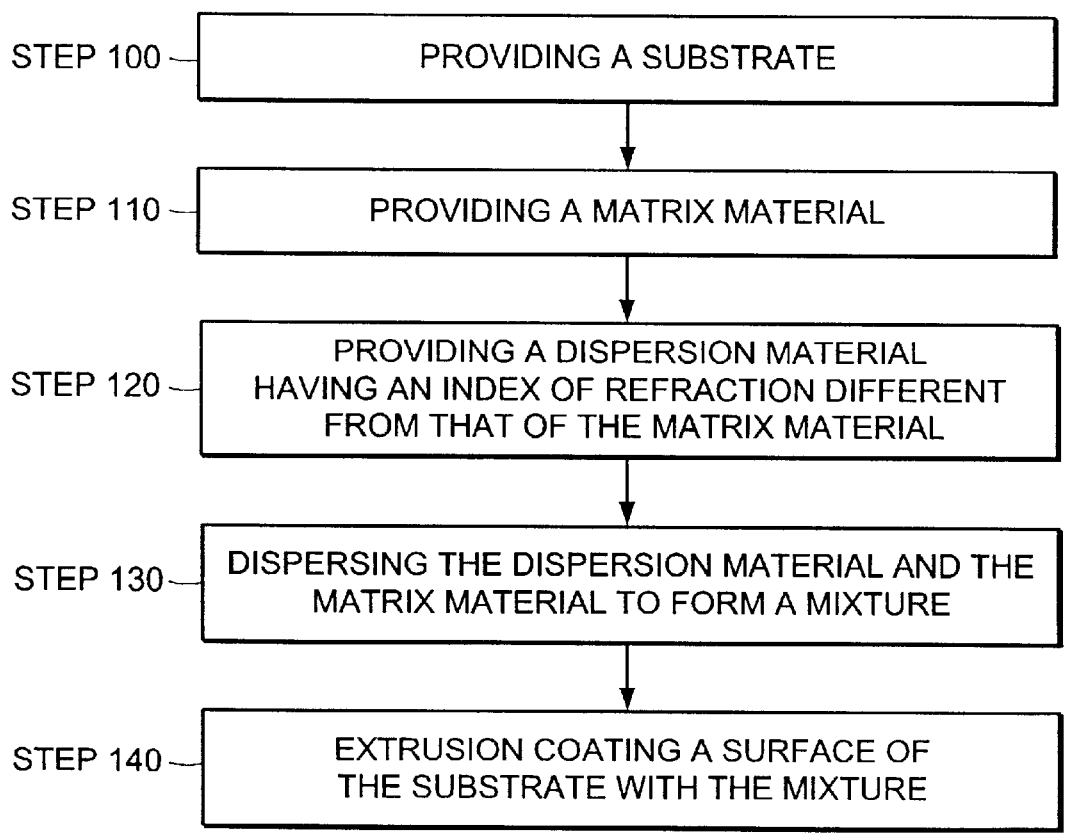
FIG. 2 is a flowchart diagram illustrating an embodiment of a method of making a projection screen element in accordance with the present invention.

FIG. 2 is a flowchart diagram illustrating an embodiment of a method of making a projection screen element in accordance with the present invention. In overview, an embodiment of the method of the invention generally includes the steps of: providing a substrate (step 100); providing a matrix material (step 100); providing a dispersion material having an index of refraction different from that of the matrix material (step 120); dispersing the dispersion material and the matrix material to form a mixture (step 130); and coating a surface of the substrate with the mixture (step 140).

In steps 100, 110 and 120, a substrate, a matrix and a dispersion material respectively is provided. These materials are as described in connection with the embodiment depicted in FIG. 1. The substrate may be translucent for a rear projection screen element. Alternatively, the substrate may be reflective for a front projection screen element. The substrate may be embossed or otherwise imparted with a texture or pattern, for example, a Fresnel lens structure. Furthermore, the substrate also may be treated to impart irregularities for the purposes of increasing coatability with the diffusive coating to be applied in step 140.

The matrix and dispersion materials are chosen such that there is a differential in the refractive index so that the resulting diffusion coating will diffuse light. Further, the particle size of the dispersion material and the relative amounts of matrix material to dispersion material may be optimized to increase the angle of view and brightness of the screen.

In step 130, the dispersion material and the matrix material are dispersed to form a mixture. If the average particle size of the dispersion material provided in step 120 is larger than desired, it may be reduced to the desired range by vigorously mixing or masticating the mixture at a temperature at which the matrix and the dispersion material are at or near their liquefying point. The size of the masticated dispersion material will depend on the ratio of dispersed material to matrix material, the viscosity ratio, and the mixing temperature. This relationship is discussed in greater detail in U.S. Pat. No. 5,932,342, issued Aug. 3, 1999. Any conventional polymer processing apparatus capable of providing the proper mixing may be used, for example, Banbury mixer; single or twin screw extruder; Hobart mixer, etc. Preferably, a twin screw extruder is used to disperse the dispersion material in the matrix and produce pellets, which then may be loaded into a melting and conveying device, for example, a single screw extruder outfitted with a slot die to coat the substrate as discussed below with regard to step 140. In an alternative embodiment of the invention, a single screw extruder with a cavity transfer mixer is utilized to both mix and extrude the resins in one single process.

In step 140, a surface of the substrate is coated with the mixture. Either or both surfaces of the substrate may be coated with the diffusion coating regardless of whether the surface is smooth or defines, for example, a Fresnel structure. Preferably, the substrate is coated by extruding the mixture onto the substrate surface. The extruder is preferably fitted with a slot die. The slot die may have an aperture between about 1 mil to about 20 mils, preferably between about 3 mils and 10 mils. Typically, the slot die is positioned from about 0.5 to about 6 above the surface of the substrate. Alternatively, the substrate may be coated with the mixture using other methods known in the art. For example, a rod coater might be used to draw the mixture across the substrate. The diffusion coating may be from about 1 mil to about 40 mils thick, preferably between about 3 mils and 10 mils thick, and most preferably between about 4 mils and about 6 mils thick. Generally, if the diffusion coating is too thin, there will be insufficient diffusion, and if the diffusion coating is too thick, the resolution will decrease to unacceptable levels.

Some or all of the dispersion particles may be oriented generally in a single direction in the plane of the sheet by setting the rate at which the substrate travels faster that the rate at which the mixture is extruded. Alternatively or additionally, the dispersion particles may be oriented by virtue of the pressure differential on either side of the die. The mixture then is hardened by cooling and/or polymerizing to form a diffusion coating upon the surface of the substrate. Additionally or alternatively, the coating may be chemically bonded using techniques known in the art. For example, the coating may contain UV sensitizers and cross-linkers and be polymerized by exposure of the mixture to ultraviolet radiation.

Practice of the invention will be still more fully understood from the following theoretical examples, which are presented herein for illustration only and should not be construed as limiting the invention in any way.

EXAMPLE 1

Front Projection Screen Element

A mixture of low-density polyethylene and polystyrene in the ratio of 80:20 is to be compounded in a Leistritz twin screw extruder such that the polystyrene particle size distribution is between about 2 microns to about 5 microns. Pellets from this process are then to be extruded from a 2 single screw extruder at about 350° F. fitted with a slot die having a slot aperture of about 8 mils. The extruded mixture will then be coated onto the aluminized surface of an aluminized polyester film. The resulting coating will be approximately 4 mils thick after it has cooled. It is estimated that the resulting projection screen element will have a gain of about 3.26, a horizontal AOV $a(\frac{1}{2})$ of 48, a vertical AOV $\alpha(\frac{1}{2})$ of 40, an asymmetry ratio of about 1.2, and a resolution of about 90% at 4 lines per mm.

EXAMPLE 2

Front Projection Screen Element

A mixture of ethylethylacrylate and polystyrene in the ratio of 90:10 is to be compounded and extruded onto the aluminized surface of an aluminized polyester film as in Example 1. The resulting coating will be approximately 4.5 mils thick after it has cooled. It is estimated that the resulting projection screen element will have a gain of about 2.22, a horizontal AOV $\alpha(\frac{1}{2})$ of 84, a vertical AOV $\alpha(\frac{1}{2})$ of 34, an asymmetry ratio of about 2.47, and a resolution of about 90% at 4 lines per mm.

EXAMPLE 3

Front Projection Screen Element

A mixture of ethylethylacrylate and polystyrene in the ratio of 90:10 is to be compounded and extruded onto the aluminized surface of an aluminized polyester film as in Example 1. The resulting coating will be approximately 5 mils thick after it has cooled. It is estimated that the resulting projection screen element will have a gain of about 1.55, a horizontal AOV $\alpha(\frac{1}{2})$ of 110, a vertical AOV $\alpha(\frac{1}{2})$ of 40, an asymmetry ratio of about 2.75, and a resolution of about 90% at 4 lines per mm.

Although generally the preferred embodiments of the invention have been shown and described, numerous variations and alternative embodiments will occur to those skilled in the art.

What is claimed is:

1. A method for making a projection screen element comprising the steps:

(a) providing a projection screen substrate;

(b) providing a matrix material;

(c) providing a dispersion material having an index of refraction different from that of the matrix material;

(d) dispersing the dispersion material and the matrix material to form a mixture; and (e) extrusion coating the mixture onto a surface of the substrate.

2. The method of claim 1, wherein step (a) comprises providing a translucent substrate.

3. The method of claim 1, wherein step (a) comprises providing a reflective substrate.

4. The method of claim 3, wherein step (a) comprises providing a metalized film.

5. The method of claim 4, wherein step (a) comprises providing an aluminum metalized film.

6. The method of claim 1, wherein step (a) comprises providing a substrate having a surface defining a Fresnel lens structure.

7. A projection screen comprising the projection screen element formed by the method of claim 1.

8. A projection screen comprising the projection screen element formed by the method of claim 1, wherein the substrate is reflective.

* * * * *